Oct. 10, 1967     J. D. REID ETAL     3,346,801
REGULATOR WITH NOISE SUPPRESSION
Filed May 9, 1963     2 Sheets-Sheet 1
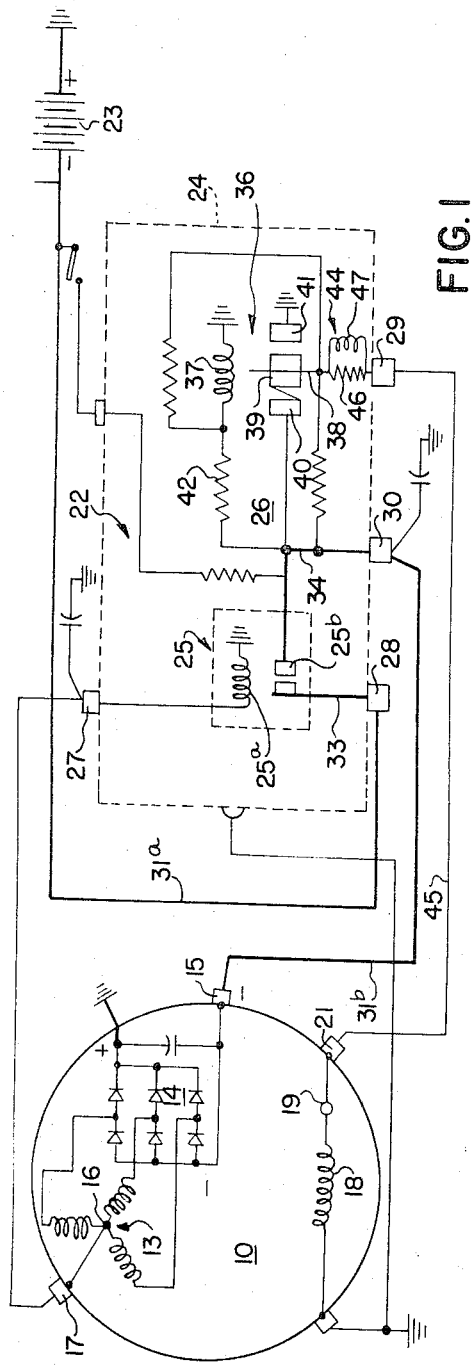
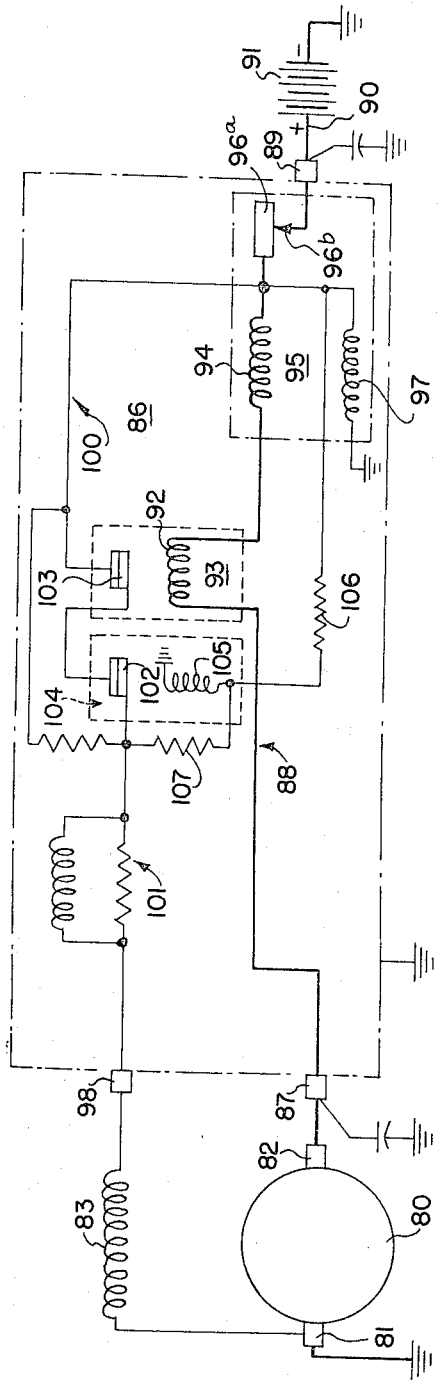
INVENTORS
JAMES D. REID
PHIL WAY
BY Williams, David,
Hoffmann & Yount
ATTORNEYS Oct. 10, 1967   J. D. REID ETAL   3,346,801
REGULATOR WITH NOISE SUPPRESSION
Filed May 9, 1963   2 Sheets-Sheet 2
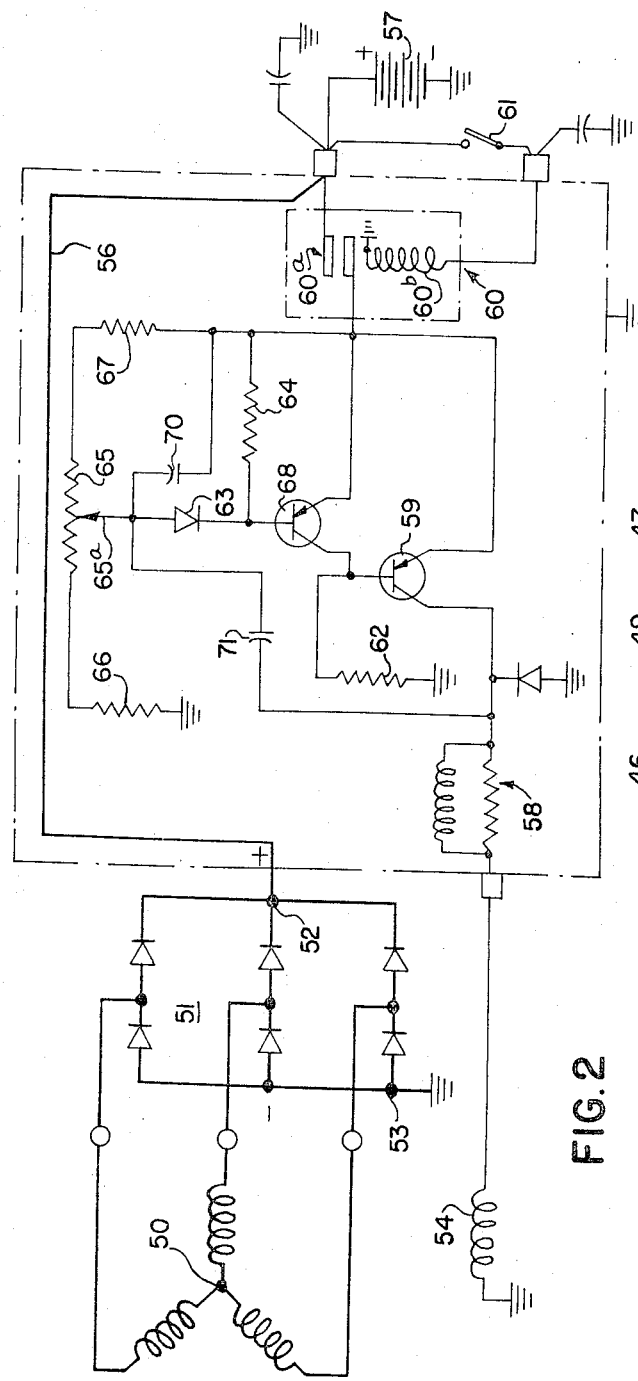
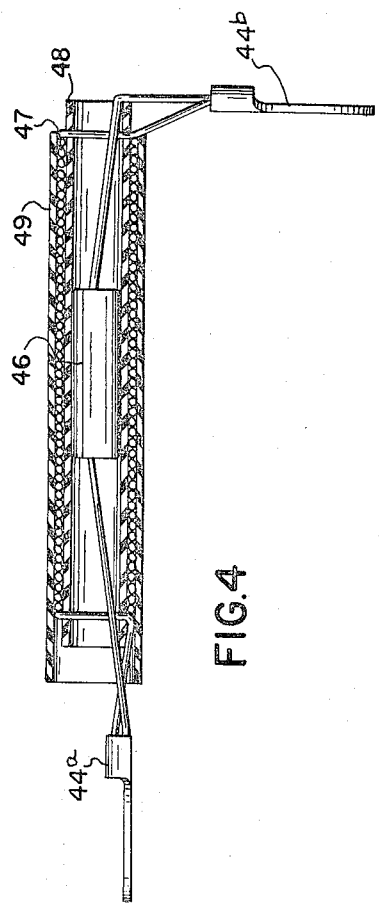
INVENTORS
JAMES D. REID
BY   PHIL WAY
Williams, David,
Hoffmann & Yount
ATTORNEYS United States Patent Office 3,346,801
Patented Oct. 10, 1967

3,346,801
REGULATOR WITH NOISE SUPPRESSION
James D. Reid and Phil Way, Lakewood, Ohio, assignors to The Leece-Neville Company, Cleveland, Ohio, a corporation of Ohio
Filed May 9, 1963, Ser. No. 279,135
5 Claims. (Cl. 322—58)

The present invention relates to control or regulating units, such as regulators for electric generating systems suitable for use with automotive vehicles.

Certain types of regulators or control units effect regulation by rapidly switching an output current on and off with the on and off periods being varied to control the average current in the output circuit of the regulator. A common example of this type of regulator is the contact-type voltage regulator commonly used in electric generating systems and, particularly, in electric generating systems for automotive vehicles. In this type of regulator, contacts are periodically made and broken to control the energization of the circuit. Similar control may be effected by static-type regulators having a transistor which is switched between conductive and nonconductive states to control the output current of the regulator. When the regulator is part of an electric generating system, the current controlled is commonly the field current of the generating machine of the system.

Such control units or regulators will often generate radio-frequency noise due to the making and breaking of the contacts, or due to junction noise of the transistor. This radio-frequency noise may present a problem, particularly when the control units are part of the electric generating systems used on police vehicles or other vehicles equipped with sensitive radio-frequency apparatus. In the past, various techniques have been used to suppress the radio-frequency noise generated by the control units or regulators, but these techniques have not always proved capable of suppressing the radio-frequency noise to such an extent that it is not troublesome to sensitive radio-receiving apparatus. Moreover, many control units and systems including such units which have heretofore been considered satisfactory with respect to the radio-frequency noise generation have proved to be troublesome generators of radio-frequency noise when particularly sensitive radio apparatus is installed in the area. For example, many electrical generating systems which have been operating on vehicles, such as police vehicles with radio equipment of relatively low sensitivity, present problems of noise when the radio apparatus in the vehicle is changed to a more sensitive type.

It is, therefore, an object of the present invention to provide a new and improved regulator or control unit having an output current which is varied by switching a control element in the output circuit between conductive and nonconductive states and particularly such a regulator or control unit suitable for use in an electrical generating system for automobiles and the like, the control unit or regulator being such that it causes less radio-frequency noise than known regulators or control systems of the same type.

Another object of the present invention is to provide a new and improved regulator or control unit of the type described, particularly such a regulator or control unit suitable for use with automotive vehicles and the like to control the electric generating system thereof, in which choke means is connected in the output circuit of the regulator or control unit to suppress radio-frequency energy generated by the switching action of the control unit.

Still another object of the present invention is to provide a new and improved control unit or regulator as in the next preceding paragraph wherein the choke means in the output circuit provides a low resistance circuit for D.C. currents and a dissipating resistance for radio-frequency energy.

A further object of the present invention is to provide a new and improved regulating unit of the vibrating contact-type wherein contacts in the output circuit are made and broken to control the energization of the output current and in which the output of the circuit includes choke means in series with the circuit for suppressing radio-frequency energy generated by the making and breaking of the vibrating contacts.

A still further object of the present invention is to provide circuit elements in the output circuit of a switching-type regulator for variably energizing an electrical device with the circuit elements being such that existing systems can be readily modified to include the elements so as to materially reduce the radio-frequency energy radiated by the system.

An additional object of the present invention is to provide a new and improved electric generating system including an electric generating machine having a rotating winding variably energized by slip rings and a lead connected to the winding through the slip rings in which the lead includes choke means for attenuating radio-frequency energy.

We have found that radio-frequency noise which is generated by the switching-type regulator or control units which have contacts of the vibrating type, or a circuit element which is switched between relatively conductive and nonconductive states to control the current in the output circuit of the regulator, tends to travel along the leads of the system in which the regulator is to be used and to be radiated therefrom even though the regulator is shielded against radiation. In the case of automotive vehicles where the regulator is controlling the field current of an electric generating machine, the radio-frequency energy and noise will tend to travel along the energizing leads for the field and will radiate along the leads or perhaps, when the field is a rotating field, at the slip rings or commutator for the field. We have found that the radio-frequency noise generation may be suppressed by including, in the output circuit of the control unit or regulator, circuit means which has a low resistance to D.C. current but which presents a dissipating resistance to radio-frequency energy. Preferably, this circuit means is located within a shielding housing and comprises a resistor in series with the contacts or element operated to switch the current in the output circuit and a coil wound about the resistor and electrically connected to the resistor immediately adjacent the ends thereof to connect the coil across the resistor. Preferably, the resistor is a nonconductive-type resistor such as a carbon resistor.

Further objects and advantages of the present invention will be apparent from the following detailed description thereof made with reference to the accompanying drawings forming a part of the present specification and in which:

FIG. 1 is a schematic showing of an alternator-rectifier generating system of the positive ground type embodying the present invention;

FIG. 2 is a schematic showing of an alternator-rectifier generating system embodying the present invention and controlled by a static voltage regulator;

FIG. 3 is a schematic showing of the present invention embodied in a direct current generating system;

FIG. 4 is a detailed showing of choke means adapted for use in the present invention; and FIG. 5 is an enlarged fragmentary sectional view of a portion of the choke means shown in FIG. 4.

While the present invention is particularly suitable for use in electrical generating systems for automotive vehicles to suppress radio-frequency noise generating therein, it will be understood that the invention may be embodied in various types of regulating and control units to suppress radio-frequency noise generated by rapidly switching current between levels to effect a variable energization of an electrical device. For purposes of explanation, the invention is shown and described as embodied in an electrical system suitable for vehicle use.

Referring to the drawings, the electrical system shown in FIG. 1 comprises an alternator-rectifier unit 10. The alternator-rectifier unit is adapted to be driven at various speeds by driving means such as a vehicle engine and the unit has a three-phase Y-connected stator winding 13 connected through a full-wave rectifier 14 to a negative output terminal 15 and to ground. The three-phase Y-connected stator winding has a neutral point 16 connected to a terminal 17 on the alternator-rectifier unit.

The alternator-rectifier unit further includes a field winding 18 on the rotor of the alternator and, as will be well understood by those skilled in the art, the rotor is driven at variable speeds from the vehicle engine when the electrical system is embodied in an automotive vehicle. The field winding 18 has one side connected to ground and the other side to a field terminal 21 of the alternator-rectifier unit. The connection to the field terminal 21 may be through a slip ring 19 indicated schematically in the connection between the field winding 18 and the terminal 21. Similar slip rings may be used to connect the field to a ground terminal if so desired. The energization of the field winding 18 controls the output of the alternator.

In addition to the alternator-rectifier unit, the system shown in the drawings comprises a control unit 22 and a battery 23 connected across the output of the alternator-rectifier unit 10. The control unit 22 includes a metallic housing 24 for a field relay 25 and a voltage regulator 26, the housing 24 having terminals for making connections to the various elements of the control unit. The housing shown has a neutral terminal 27, a battery terminal 28, a field terminal 29, a generator terminal 30, and a terminal I.

In the embodiment of FIG. 1, the filed relay 25 has a coil 25a which, when energized, closes contacts 25b thereof to connect the battery terminal 28 to the generator terminal 30. The battery terminal 28 is connected to the negative terminal of the battery by a load conductor 31a, while the generator terminal 30 is connected to the negative terminal 15 of the alternator-rectifier unit by a load conductor 31b. The field relay coil 25a is actuated when the neutral point 16 of the winding 13 reaches a certain voltage. To this end, the field coil 25a is connected to the neutral terminal 27 of the housing 24 which is, in turn, connected to the neutral terminal 17 and the neutral point 16 of the alternator-rectifier unit 10. The other side of the coil 25a is connected to ground so that the energization of the coil 25a depends upon the voltage drop between the neutral point 16 of the alternator-rectifier unit and ground.

When the field relay coil 25a is energized, the closing of its contacts 25b completes the circuit through conductors 31a, 31b for connecting the negative terminal of the battery 23 to the negative terminal 15, as above described, and also completes a circuit for energizing the field winding 18 through the contacts of a differential-type voltage regulator 36. The voltage regulator 36 has a voltage regulating coil 37 which operates an armature 38 carrying a contact element 39 which is normally in engagement with a contact 40 when the voltage regulator coil 37 is unenergized and is actuated into contact with a contact 41 of the regulator when the voltage across the regulating coil 37 comes up to a predetermined level. When the contact 39 is actuated into engagement with the contact 41, it will be maintained in engagement with the contact 41 until the voltage across the coil drops to a predetermined lower level. Such differential-type voltage regulators are well known in the art and require no further detailed description. Suffice it to say that one side of the voltage regulator coil 37 is connected to the conductor 34 through a ballast resistance 42 and the other side of the coil is connected to ground and that the contact 40 of the regulator is connected to the conductor 34 so that, when the field relay coil is first energized, a circuit is made through the contact 40 and the contact element 39. The circuit made through contact 40 effects the energization of the field and to this end, the contact element 39 is connected to the field terminal 29 on the housing 24 through a circuit element 44 which will be described in more detail hereinafter. The field terminal 29 in turn is connected to the field terminal 21 of the alternator-rectifier unit 10 by a connection 45 so that the field winding 18 is energized when the contacts 40, 39 are made and the field relay is energized. When the voltage across the regulating coil 37 reaches a predetermined magnitude indicating the higher level of regulation to be maintained, the contact 39 is actuated into engagement with the contact 41 to connect the negative side of the field to ground and thereby breaks the energizing circuit therefor.

From the above description, it can be seen that on starting, the field relay 25 is de-energized and the contacts 25 are open to disconnect the battery from the field. To provide field current for starting, the negative side of battery 23 is connected to the terminal I by a switch S which may be the ignition switch of an automobile, and the terminal I is connected to the conductor 34 by a resistor R.

The operation of the voltage regulator 36 in making and breaking the field circuit will generate radio-frequency energy in the field circuit and this will cause the system to act as a radio-frequency noise generator. The radio-frequency energy generated by the voltage regulator will be radiated from the lead 45 and the slip ring 19 even though the housing 24 forms an effective shield about the voltage regulator coil and contacts. We have found that this radio-frequency noise can be radically attenuated and suppressed by using the circuit element 44 in the field circuit.

The circuit element 44 shown in FIG. 1 and in FIG. 4 comprises a resistor 46 and a coil 47 connected in parallel with each other with the circuit element being in series with the field winding 18. The resistor 46 is preferably a noninductive resistor, such as a carbon resistor, and the coil 47 is wound around the resistor and connected to the ends of the resistor as is shown in FIG. 4. The coil, of course, is insulated from the resistor. The preferred structure for the coil and resistor is shown in FIG. 4 and, as shown therein, the resistor is disposed within a tube 48 of insulating material, the coil 47 is wound on the tube and an outer tube 49 receives and covers the coil and resistor. The circuit element 44 has terminal leads 44a, 44b connected to the opposite ends of the coil and resistor and which are used to connect the element in series in the field circuit.

In operation, the coil 47 will provide a low resistance D.C. path but will have a high impedance insofar as radio-frequency energy is concerned. The resistor 46 will present a lower impedance to the radio-frequency energy but will act as a dissipating resistance so that the radio-frequency energy is effectively dissipated and does not travel along the lead 45 so as to be radiated therefrom or from the slip rings 19. Inasmuch as the circuit element 44 is located within the housing 24, the housing 24 will act as a radio-frequency shield for any radio-frequency noise radiated from the circuit element 44. By way of example, good results have been obtained for 40, 60 and 100 ampere alternator-rectifier units for resistance values of the carbon resistor of 22 ohms and with a coil 47 of fifty turns of No. 20 wire.

Preferably, noise suppression capacitors are used between each of the terminals 27, 28, I, and ground. These capacitors C may be 200-volt nylar tubular capacitors of .0047 mfd.

The present invention is also useful in an alternator-rectifier generating system where the energization of the field winding is controlled by a static type regulator. Such an alternator-rectifier system is shown in FIG. 2 and, as shown therein, the alternator-rectifier unit includes a three-phase, Y-connected stator winding 50 connected to the input terminals of a full-wave rectifying unit 51 having a positive output terminal 52 and a negative output terminal 53 connected to ground. The output of the alternator is determined by the energization of a field winding 54 having one side connected to ground and the other side connected to be energized from a load conductor 56 connected to the positive terminal 52 and to a battery 57. The connection connecting the field winding 54 to the conductor 56 includes, in series, a circuit element 58 corresponding to the circuit element 44 of the first-described embodiment, the emitter-collector path of a transistor 59, and the contacts 60a of a field relay 60 having a relay coil 60b which is energized from the battery 57 when a switch 61 is closed. The switch 61 may be the contacts of the ignition switch when the generating system is used with an automotive vehicle. When the switch 61 is closed, the coil 60b of the field relay is energized to close the contacts 60a to effect energization of the field winding 54 provided the transistor 59 is conductive. The conduction of the transistor 59 is regulated in accordance with the output of the alternator-rectifier unit. When the contacts 60a are closed, the emitter of the transistor 59 is connected to the positive side of the battery and an input current flows since the base of the transistor 59 is connected to the negative side of the battery or ground through a resistor 62. This will render the transistor 59 conductive to effect energization of the field. As the output of the alternator-rectifier unit increases, it will reach a predetermined magnitude which will cause a Zener diode 63 to break down and conduct. The Zener diode 63 is connected to the conductor 56 through a circuit including a resistor 64 and the contacts 60a of the field relay and is connected to ground through a potentiometer resistance 65 and a resistor 66 connected in series with the potentiometer resistance 65. The Zener diode 63 is connected to a sliding tap 65a on the potentiometer resistance and the positive end of the potentiometer resistance 65 is connected to the negative side of a resistor 67 having its positive end connected to the conductor 56 through the contacts 60a. A transistor 68 has its base-emitter circuit connected across the resistor 64 and its emitter-collector circuit across the base-emitter circuit of the transistor 59. Consequently, when the Zener diode 63 breaks down and conducts, a base current results in transistor 68 which is of sufficient magnitude to render the transistor 68 conductive to lower the voltage drop across the base-emitter circuit of the transistor 59 and thereby render the transistor 59 less conductive and to lower the current flowing in the field winding 54. After the Zener diode breaks down, the current in the input circuit of the transistor 68 will increase if the voltage at the terminals 52, 53 continues to increase. However, an increase in input current in the base-emitter circuit of transistor 68 causes an increase in the output current of transistor 68 and a decrease in the input current to transistor 59. This causes less current to flow in the emitter-collector circuit of the transistor 59 in series with the field winding 54. If desired, the breakdown of the Zener diode 63 could result in a base current which drives the transistor 68 to saturation, causing the transistor 59 to be switched off or to a state of very low conductivity, so that the action of the regulator is similar to an off-on regulator.

Preferably, the static regulator includes a smoothing condenser 70 connected across the Zener diode 63 in the resistor 64 and a smoothing condenser 71 connected between the tap 65a of the potentiometer resistance 65 and the collector of the transistor 59. Also, a Zener diode 62 is preferably connected between the collector of the transistor 59 and ground to provide protection for the transistor 59 from reverse current surges.

While the regulating circuit of FIG. 2 does not use a "make" and "break" contact-type of regulator, radio-frequency noise is generated in the transistor 59 and the circuit element 48 functions to dissipate the radio-frequency energy. Once again, the circuit element 58 is preferably located within a metal housing together with the static elements of the voltage regulator.

The present invention is also useful in minimizing the radio-frequency noise radiated by a direct current generating system. A direct current generating system is shown in FIG. 3 and, as shown therein, the system includes a D.C. generator 80 having armature terminals 81, 82 and a shunt field winding 83. The armature terminal 81 is connected to ground.

The generating system includes a control unit 86 for controlling the energization of the field winding 83. The control unit 86 includes a terminal 87 which is connected to the positive terminal 82 of the armature of the D.C. generating machine and to a terminal 89 of the unit. The terminal 89 is connected to a load conductor 90 and, in the illustrated embodiment, a battery 91 is connected between the load conductor and ground.

The circuit 88 in the control unit includes a series coil 92 of a current-limiting relay 93 and a current coil 94 of a reverse current relay 95 having contacts 96a, 96b also connected in series in the circuit 88. The reverse current relay also has a shunt coil 97 for operating the contacts 96a, 96b with the latter coil being connected between the contact 96a and ground.

The field winding 83 has one side connected to ground and its other side connected to a field terminal 98 of the control unit. The field terminal 98 is connected to the contact 96a by a field energizing circuit 100. The field energizing circuit 100 includes a circuit element 101 corresponding to the circuit element 44 and having one side connected to the terminal 98 and the other side connected through contacts 102 and through contacts 103 to the contact 96a of the reverse current relay. The contacts 102 are part of a voltage regulator 104 and the contacts 103 are the contacts of the current-limiting relay 93.

The voltage regulator 104 includes a regulating coil 105 having its negative side connected to ground and its positive side connected to the contact 96a by a ballast resistor 106. The positive side of the coil is also connected to a point in the circuit 100 between the circuit element 101 and the contacts 102 by a secondary resistor 107. As the D.C. generating machine comes up to voltage, the shunt coil 97 operates to close the contacts 96a, 96b to connect the armature of the generating machine to the load conductor 90 through the current coils 92, 94. Since the circuit 100 connects the field winding to the contact 96a, the field will be supplied, through the contacts 103, 102 and the circuit element 101, with the current from the armature as it is coming up to voltage. When the voltage of the generating machine reaches a maximum level of regulation, the voltage regulating coil 105 will be energized to open the contacts 102 to de-energize the field winding 83. When the voltage of the machine drops to a predetermined lower level, the contacts 102 will close to again energize the field. The making and breaking of the contacts will, as in the first-described embodiment, generate radio-frequency noise, but this noise will be dissipated in the circuit element 101. Preferably, the terminals 87, 89 are connected to ground by respective noise suppression capacitors as shown in the drawings. The elements of the control unit 86 are preferably housed within a metallic housing indicated by dot-dash lines.

The current-limiting coil 92 will function to open the field circuit in the case of a current overload, while the current coil 94 will disconnect the load circuit from the battery in the case of a current overload and the shunt coil 97 will open the contact 96a to disconnect the battery in case of a high voltage condition.

It can now be seen that the present invention provides a new and simplified manner of minimizing radio-frequency noise generated in systems such as electrical generating systems. The means utilized to minimize the radio-frequency noise is such that it can be quickly and easily applied to existing systems. It is also advantageous in view of the fact that the circuit element can be connected internally inside of a housing and need not be connected between the housing of the control unit and ground as in the case of the other noise suppression elements, such as the noise suppression capacitors shown in the drawings.

While the present invention has been shown as embodied in certain types of electrical generating circuits, it will be appreciated by those skilled in the art that it is useful in other types of generating circuits and it is hereby our intention to cover all such constructions, modifications, and arrangements which fall within the ability of those skilled in the art and within the scope and spirit of the present invention.

Having described our invention, we claim:

1. In an electric generating system, an electric generating machine having a winding variably energized to control the electrical output of the machine, a regulator connected to the output side of said machine for controlling the energization of said winding in response to the magnitude of the electrical output of said machine, a lead extending from the output of the regulator to said winding, and a low D.C. resistance radio-frequency filter connected between said regulator and said lead for passing direct current from said regulator to said winding to energize the latter and for preventing radio-frequency energy produced by the operation of said regulator from passing to said lead to be radiated from the latter or from said generating machine.

2. A generating system according to claim 1 and further comprising a housing enclosing both said regulator and said filter and providing a radio-frequency shield therefor.

3. A generating system according to claim 1, wherein said filter comprises a resistor having a sufficiently high resistance to dissipate radio-frequency energy, and a coil connected in parallel with said resistor and presenting a low resistance to direct current and a high impedance to radio-frequency energy.

4. A generating system according to claim 3, wherein said coil is wound around said resistor and has its opposite ends connected to the resistor adjacent the respective opposite ends of the latter.

5. In an electric generating system on a vehicle, an alternator-rectifier unit having a field winding variably energized to control the output voltage of said unit, a voltage regulator connected to the output side of said alternator-rectifier unit for controlling the energization of said winding in response to the output voltage of said unit, said voltage regulator including means for switching energizing current at rates less than radio-frequency rates but producing radio-frequency energy by said switching, a radio-frequency filter connected to the output of said voltage regulator, and a lead extending between said filter and said field winding of the alternator-rectifier unit, said filter substantially preventing the radio-frequency energy produced by said switching in the voltage regulator from passing to said lead to be radiated from the lead or from said alternator-rectifier unit.

References Cited

UNITED STATES PATENTS

| | | | |
|---|---|---|---|
| Re. 19,935 | 12/1934 | Loth | 325—473 |
| 1,208,530 | 12/1916 | Faccioli | 307—105 X |
| 1,230,615 | 6/1917 | Steinmetz | 307—105 X |
| 1,376,400 | 5/1921 | Chubb | 322—78 X |
| 2,209,051 | 7/1940 | Clayton | 322—28 X |
| 2,622,152 | 12/1952 | Rosch | 333—81 |
| 2,767,367 | 10/1956 | Black | 322—32 |
| 2,810,105 | 10/1957 | Henrich | 323—22 |
| 3,076,935 | 2/1963 | Jones | 325—477 X |
| 3,098,972 | 7/1963 | Howard | 325—473 X |
| 3,116,446 | 12/1963 | Healey | 321—18 |
| 3,164,769 | 1/1965 | Anderson | 322—32 |
| 3,201,698 | 8/1965 | Irelan | 333—76 X |

MILTON O. HIRSHFIELD, *Primary Examiner.*

J. J. SWARTZ, R. V. LUPO, *Assistant Examiners.*